Patented Nov. 22, 1938

2,137,627

UNITED STATES PATENT OFFICE 2,137,627

CLARIFICATION OF VINYL RESINS

Marion C. Reed, Lakewood, Ohio, assignor to Carbide and Carbon Chemicals Corporation, a corporation of New York No Drawing. Application May 14, 1936,
Serial No. 79,708

8 Claims. (Cl. 260—2)

This invention relates to the clarification of vinyl resins, and in particular to a method for effective removal of colloidal and clouding materials from solutions of such resins. The vinyl resins contemplated by this invention include any of the resinous products formed by the polymerization or condensation of vinyl compounds or mixtures thereof, and the invention is especially applicable in clarifying the resins resulting from the polymerization of vinyl halides, either alone or in mixture with vinyl esters of aliphatic acids or other vinyl compounds. Products of the conjoint polymerization of vinyl chloride with vinyl acetate which contain from about 60% to about 95% of the chloride in the polymer are representative of such resinous bodies.

Many uses for vinyl resins in lacquers, varnishes, adhesives, plastics, molding compositions, and the like are known, as are also various methods and means of effecting polymerization of vinyl compounds. But whatever the process employed in making the resin, difficulty has frequently been encountered in removing therefrom a certain cloudiness, which is detrimental in the preparation of products, such as films and molded articles, where exceptional clarity is desired. The material inducing this turbid effect remains suspended in a colloidal form when a solution of the resin is made, and it is exceedingly difficult, if not impossible, to remove this colloidal suspension by ordinary filtration. While filtration of the resin solution in the presence of filter aids, such as diatomaceous earth, will effect some improvement in clarity, the resin clearness desired for many uses cannot normally be obtained in this manner, even after repeated filtering at a very low rate of flow.

In accordance with my invention I also employ filtration, but precede this step by a treatment of the solution of the resin with a coagulating agent adapted to effect flocculation of the suspended colloidal clouding material into particles of appreciable size, which are readily and rapidly removed by subsequent filtering. This provides an economical and very effective method of producing vinyl resins of exceptional clarity.

I have found that the addition of small quantities of certain weak acids to a solution of the vinyl resin will cause a coagulation of suspended matter into a form which can be filtered out in the usual manner, after not more than one or two passes of the liquid through the filtering medium. In a common process of polymerization the vinyl resin product is obtained in a solution of acetone or other solvent, and this solution may be treated directly with the coagulating agent. Where the resin is produced by other means, such as those which do not employ a solvent, it is dissolved in a suitable organic solvent prior to coagulating the cloudy suspension. The nature of the acid added will be governed to a certain extent by the particular resin solvent employed, as the most effective coagulation is obtained with an acid which is soluble in the resin solution and thus uniformly dispersed throughout the solution. Among the acids actually tested and found suitable for this purpose are polybasic acids of both inorganic and organic nature including such acids as phosphoric, succinic, tartaric, and citric acids. The monobasic lactic and salicylic acids which, like tartaric and citric acids, contain hydroxyl groups, are also effective coagulants. The amount of acid necessary in the solution will also vary with the nature of the solvent employed as well as the concentration of the solution, but in any event very small quantities, within a maximum of about 0.5% by weight to as little as 80 parts of acid per million parts of solution by weight, have shown the desired function.

As a specific example of the invention and the advantages therein, the above-described treatment was applied to a vinyl resin formed by the conjoint polymerization of vinyl chloride with vinyl acetate, and which contained about 86% by weight of vinyl chloride in the polymer. This resin was dissolved in acetone in an amount forming approximately a 20% solution, and to this solution there was added about 0.03% by weight of phosphoric acid. After standing for a period of two to three hours the cloudy material was flocculated into relatively large particles, which were completely removed after two passes of the solution through a filter using diatomaceous earth as a filter aid. As proof of the effectiveness of the acid cogulant, an identical solution was filtered in the same manner without addition of phosphoric acid. After several passes of the solution a slight improvement in clarity was noticed, but the resin still retained an undesirable cloudiness.

Numerous tests similar to the above, with equally effective results, have also been made employing tartaric, citric, lactic, salicylic and succinic acids. In all instances not more than about one part of the acid to 200 parts of the resin solution by weight is necessary to obtain a readily filterable flocculant, and as little as 80 parts of tartaric or citric acid per million parts of solution has materially aided in the resin clarification.

Subsequent to the filtration step the solution may be further treated as desired, and the resin processed in any known manner. To avoid presence of acid coagulant in the final resin, the clarified solution may be neutralized with triethanolamine, triisopropanolamine, or other organic base, or where solvent extraction and precipitation of the resin is employed after clarifying, the acid coagulant may be entirely removed in this manner, without separate treatment for this purpose. By any preferred subsequent processing, the acid remaining will, in any event, be present in such minor traces that it will have no deleterious effect on the heat and light stability or other properties of the resin.

Modifications in the specific procedure described will be evident and are included within the scope of the invention, which should not be limited other than as defined in the appended claims.

I claim:

1. A method of clarifying vinyl resins, which comprises dissolving the resin in an organic solvent, adding to the solution so formed an acid of the group consisting of phosphoric, tartaric, citric, lactic, salicylic, and succinic acid, the amount of said acid addition being sufficient to coagulate suspended colloidal matter in said solution, and filtering the solution to remove the coagulated material.

2. A method of clarifying vinyl resins, which comprises dissolving the resin in an organic solvent, adding to the solution so formed not more than about 0.5% of an acid of the group consisting of phosphoric, tartaric, citric, lactic, salicylic, and succinic acid, allowing said solution to stand until flocculation occurs, and filtering the solution to remove the flocculated material.

3. A method of clarifying vinyl resins which comprises dissolving the resin in an acetone solvent, adding to the solution so formed not more than about 0.5% of an acid of the group consisting of phosphoric, tartaric, citric, lactic, salicylic, and succinic acid, allowing said solution to stand until flocculation occurs, and filtering the solution to remove the flocculated material.

4. A method of clarifying vinyl resins formed by the conjoint polymerization of vinyl chloride with vinyl acetate and containing 60% to 95% vinyl chloride in the polymer, which comprises dissolving the resin in an organic solvent, adding to the solution so formed an acid of the group consisting of phosphoric, tartaric, citric, lactic, salicylic, and succinic acid, the amount of said acid addition being sufficient to coagulate suspended colloidal matter in said solution, and filtering the solution to remove the coagulated material.

5. A method of clarifying vinyl resins formed by the conjoint polymerization of vinyl chloride with vinyl acetate and containing 60% to 95% vinyl chloride in the polymer, which comprises dissolving the resin in an acetone solvent, adding to the solution so formed not more than about 0.5% of an acid of the group consisting of phosphoric, tartaric, citric, lactic, salicylic, and succinic acid, allowing said solution to stand until flocculation occurs, and filtering the solution to remove the flocculated material.

6. A method of clarifying vinyl resins formed by the conjoint polymerization of vinyl chloride with vinyl acetate and containing 60% to 95% vinyl chloride in the polymer, which comprises dissolving the resin in acetone to form about a 20% solution, adding to said solution sufficient phosphoric acid to coagulate suspended colloidal matter therein, allowing said solution to stand until flocculation occurs, and filtering the solution to remove the flocculated material.

7. A method of clarifying vinyl resins formed by the conjoint polymerization of vinyl chloride with vinyl acetate and containing 60% to 95% vinyl chloride in the polymer, which comprises dissolving the resin in acetone to form about a 20% solution, adding to said solution sufficient tartaric acid to coagulate suspended matter therein, allowing said solution to stand until flocculation occurs, and filtering the solution to remove the flocculated material.

8. A method of clarifying vinyl resins formed by the conjoint polymerization of vinyl chloride with vinyl acetate and containing 60% to 95% vinyl chloride in the polymer, which comprises dissolving the resin in acetone to form about a 20% solution, adding to said solution sufficient citric acid to coagulate suspended colloidal matter therein, allowing said solution to stand until flocculation occurs, and filtering the solution to remove the flocculated material.

MARION C. REED.